United States Patent [19]

Marino

[11] Patent Number: 4,707,969
[45] Date of Patent: Nov. 24, 1987

[54] METHOD FOR SPILL CONTAINMENT

[76] Inventor: Thomas F. Marino, 26 Hydelor Ave., Prospect, Conn. 06712

[21] Appl. No.: 871,908

[22] Filed: Jun. 9, 1986

Related U.S. Application Data

[62] Division of Ser. No. 693,273, Jan. 22, 1985, Pat. No. 4,603,432.

[51] Int. Cl.⁴ .............................................. B65B 11/58
[52] U.S. Cl. .......................................... 53/449; 53/473
[58] Field of Search ................. 53/449, 469, 471, 473; 220/429

[56] References Cited

U.S. PATENT DOCUMENTS

| | | |
|---|---|---|
| 956,562 | 5/1910 | Beers et al. . |
| 2,050,096 | 12/1934 | Johnson . |
| 2,212,390 | 6/1939 | Conklin . |
| 2,395,802 | 3/1944 | Bramson . |
| 2,454,013 | 3/1945 | Scherzinger . |
| 2,761,481 | 7/1954 | Boatwright . |
| 3,422,985 | 1/1969 | Rinehart . |
| 3,682,372 | 8/1972 | Rodley . |
| 3,747,293 | 7/1973 | Van Slooten et al. ........... 53/469 X |
| 3,822,037 | 7/1974 | Long . |
| 3,961,655 | 6/1976 | Nattrass et al. . |
| 3,999,653 | 12/1976 | Haigh et al. ......................... 220/429 |
| 4,113,146 | 9/1978 | Williamson . |
| 4,136,723 | 1/1979 | Skaadel et al. . |
| 4,153,146 | 5/1979 | Patton et al. . |
| 4,165,024 | 8/1979 | Oswalt et al. . |
| 4,193,518 | 3/1980 | Holmes . |
| 4,205,750 | 6/1980 | Dews ................................. 53/449 X |
| 4,207,937 | 6/1980 | Sandeman et al. . |
| 4,221,266 | 7/1980 | Massey . |
| 4,224,970 | 9/1980 | Williamson et al. . |
| 4,301,848 | 11/1981 | Beaven et al. . |
| 4,306,668 | 12/1981 | Love . |
| 4,306,669 | 12/1981 | Grether . |
| 4,307,764 | 12/1981 | Nattrass . |
| 4,501,305 | 2/1985 | Zola et al. . |
| 4,549,845 | 10/1985 | Ramsey ............................. 53/473 X |

FOREIGN PATENT DOCUMENTS

| | | |
|---|---|---|
| 281680 | 1/1915 | Fed. Rep. of Germany . |
| 30594 | 3/1977 | Japan ..................................... 53/469 |

Primary Examiner—Robert L. Spruill
Assistant Examiner—Steven P. Weihrouch

[57] ABSTRACT

A method for liquid spill containment utilizes a collapsible and reusable spill containment bag which is flexible and includes a main body portion and a tubular extension portion at the upper end thereof. The extension portion which can be folded or inserted into the main body portion enhances the storage capacity of the bag and may form a closure for the upper end of the bag. Engagement means are provided on both the main body portion and the extension portion. In using the bag, the engagement means are used to suspend the bag in various positions on a tanker truck with a liquid transport system to receive or contain a leak. The containment bag may also be utilized to collect liquid leaking from a drum or barrel.

8 Claims, 15 Drawing Figures

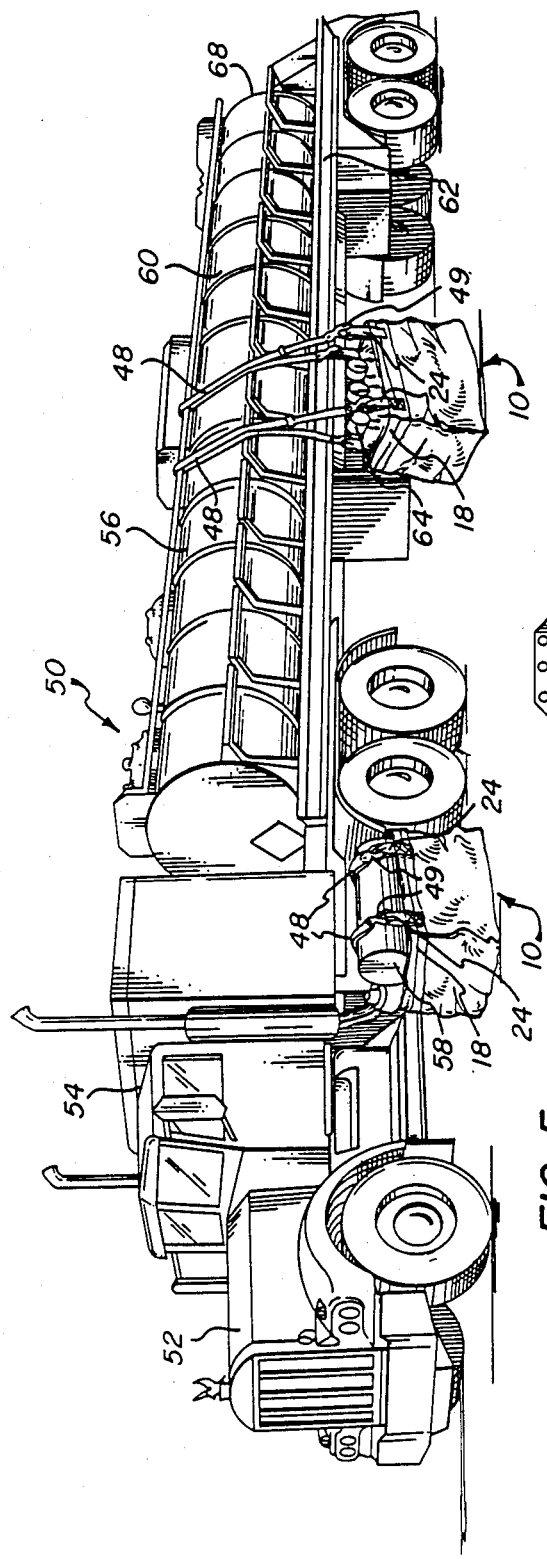
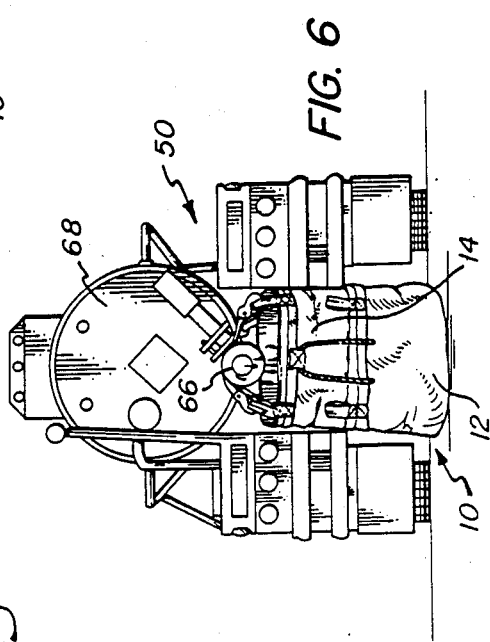
FIG. 5
FIG. 6

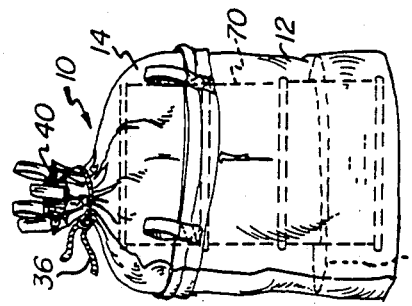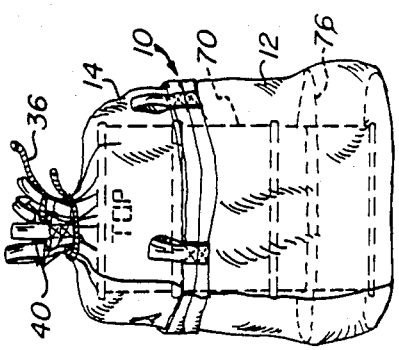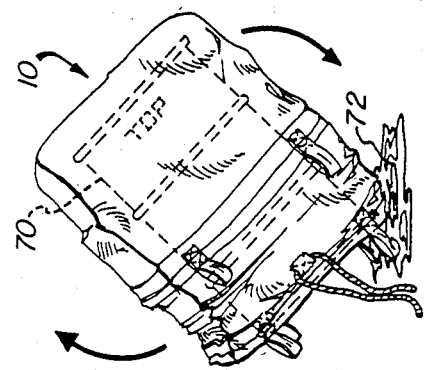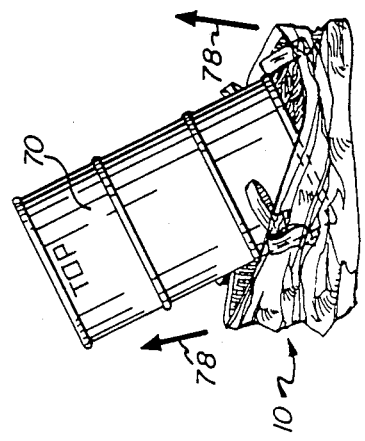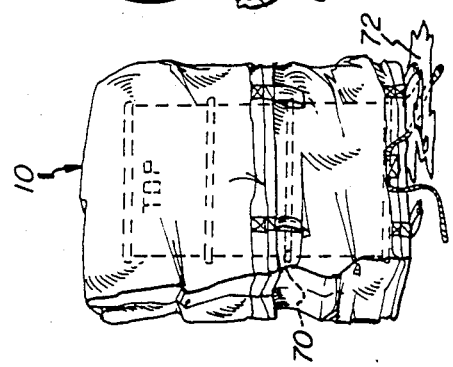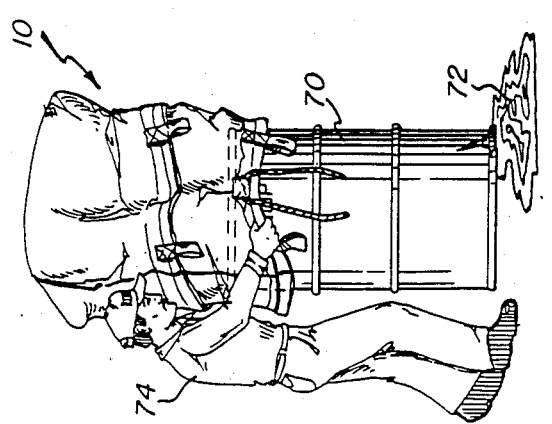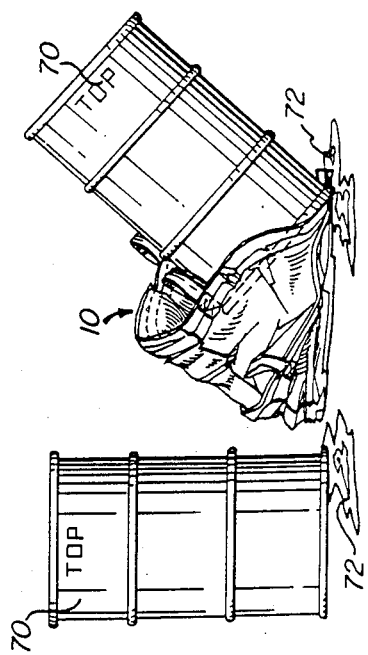

METHOD FOR SPILL CONTAINMENT

CROSS-REFERENCE TO RELATED APPLICATION

The present application is a division of my copending application Ser. No. 693,273, filed Jan. 22, 1985 now U.S. Pat. No. 4,603,432 granted July 29, 1986.

BACKGROUND OF THE INVENTION

The present invention relates generally to a method and for containing spills of liquid material, and, more particularly, to a method for spill containment using a collapsible bag.

The highway transportation of hazardous and non-hazardous liquid chemical and petroleum products is a thriving industry in this and other countries with literally billions of gallons of such products being transported annually. Tanker trucks having liquid transporting systems are normally utilized to effect the transport of these materials and will sometimes develop leaks in their valves or tanks, thereby permitting the liquid material contained therein to escape to the outside environment in the form of a liquid spill.

Numerous statutes have been enacted which provide for monetary fines against operators of tanker trucks if a defect in the liquid transporting system is found and/or a liquid spill occurs. The operators may also be required to absorb the cost of the cleanup of the liquid spill. Heretofore, the transportation industry has not had a simple readily available means to contain these leakage problems to minimize their environmental impact.

Hazardous and non-hazardous liquid materials are also transported and stored in large cylindrical barrels or drums which have a tendency to leak as a result of improper manufacturing techniques, improper or abusive handling thereof or chemical reactions within the materials stored. It has been the practice of the industry to place a barrel with a leakage problem in an oversized barrel or drum commonly called an "overpack", thereby contaning the leaking material. However, these "overpacks" are quite expensive to purchase, very difficult to store and extremely cumbersome to handle. Therefore, it would be desirable to provide a system to handle these leaking barrels which would alleviate the inconveniences presented by the "overpack" drums.

It is an object of the present invention to provide a novel method for spill containment using a collapsible bag which is readily usable to contain a spill of liquid material.

It is also an object to provide such a method of spill containment which may be effected quickly to minimize the environmental impact of a liquid spill.

Another object is to provide such a method which can be readily practiced without special equipment.

SUMMARY OF THE INVENTION

It has now been found that the foregoing and related objects may be readily obtained by a method using an emergency spill containment bag for receiving and containing liquid materials. This leak-proof flexible bag member a fluid impervious material having a main body portion defining an enclosure with bottom and side walls. The body portion has an opening at the top end thereof and a tubular extension portion a fluid impervious material is bonded at its inner end to the top end, and is open at its other end and foldable into the main body portion. A multiplicity of pairs of engagement means is provided on the main body portion adjacent the upper end thereof for mounting the bag on a support structure. A multiplicity of pairs of engagement means is also provided on the extension portion adjacent the other end thereof for mounting said bag on a support structure.

Preferably, the engagement means includes portions of loop-like configuration. The plurality of loop means on the main body portion is preferably two pairs of loop means attached to the sidewall on opposite sides of the opening.

The main body portion is desirably formed from a first length of material providing the bottom wall and two opposed sidewalls extending from the periphery of said bottom wall. Two additional lengths of material provide two opposed sidewalls and are secured along their lower and side margins to the first length to form the enclosure. Strap means is provided as a part of the bag and is adapted to engage selected ones of the plurality of engagement means, and closure means is provided adjacent the outer end of the extension portion to effect closure thereof. This closure means is conveniently a flexible cord element attached to the extension portion adapted to extend thereabout. Reinforcement means may be provided on the bottom wall.

In the method of containing a liquid spill from a tanker truck, the spill containment bag is suspended from a portion of the tanker truck having a leaking liquid containment vessel with the opening in said bag being disposed below and adjacent the point of the leak whereby the liquid material flows through the opening and into the enclosure. The containment bag is suspended by a plurality of loop means on the main body portion and strap means engaged with the loop means, and with the strap means being secured to the truck.

In containing a liquid spill from a liquid containing drum, the leaking drum is inserted through the opening and into the enclosure, and the liquid material escaping from the drum is contained within the enclosure. Closure means is used to close the opening in the containment bag about the drum. To insert the drum, it may be set in an upright position, after which the bag is placed thereover, and the drum and bag are inverted in tandem. Alternatively, the drum may be set in an upright position, the bag placed underneath the drum, and then the bag is pulled upwardly about the drum to enclose it.

BRIEF DESCRIPTION OF THE DRAWINGS

FIGS. 5-7 are perspective views of a tank truck with a liquid containment system showing various ways the spill containment bag can be attached thereto;

FIGS. 8-11 are diagrammatic views illustrating the sequence of steps used to insert a drum or barrel into the spill containment bag; and FIGS. 12-15 are similar views illustrating another sequence of steps used to insert a drum or barrel into the spill containment bag.

DETAILED DESCRIPTION OF THE INVENTION

Figure 1:
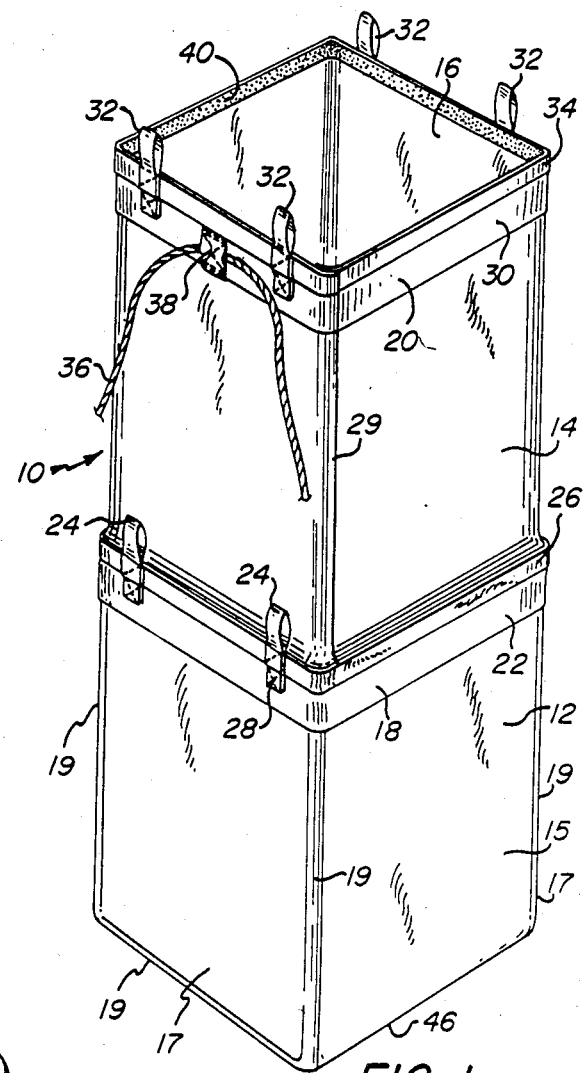
FIG. 1 is a perspective view of a spill containment bag for use in the present invention shown in a fully extended condition.

Turning first in detail to FIG. 1, therein illustrated a spill containment bag for use in the present invention and generally designated by the numeral 10. The containment bag 10 has a generally rectangular configuration and includes a main body portion 12 with an extension portion 14 having an upper opening 16 for accessing the interior of the containment bag 10. The main body portion 12 and the extension portion 14 have lifting or support harnesses thereon and respectively designated by the numerals 18 and 20 for purposes to be hereinafter described.

The main body portion 12 is manufactured from three pieces of sheet material with welded or heat bonded seams to provide a leak-proof container. The sheet material is preferably a foldable, durable synthetic rubber such as natural rubber (e.g. butadiene/acrylonitrile copolymer, polychloroprene, polyisoprene) polyethelene, polypropylene, and polyvinyl chloride, capable of withstanding highly concentrated acids, solvents, petrochemicals and other liquid chemical compounds of either hazardous or non-hazardous nature. The resin sheeting may be reinforced with cotton, rayon, nylon and other fibers, and may comprise a laminate of a woven material with a resin face providing the fluid impermeable structure. The pieces of sheet material of the main body 12 are initially cut to size to provide a central portion 15 and two side portions 17. The central portion 15 forms the bottom wall 46 and two sides of the main body 12. The rectangular configuration of the main body 12 is completed by welding the side portions 17 to the central portion along seams 19. The areas of the intended seams 19 are cleaned and the overlapping portions are heated with a welding or heating tool to melt or bond the portions 15 and 17 together to create the seams 19.

Attached to the main body portion 12 adjacent the upper end thereof is the lifting harness 18 and the extension portion 14. The lifting harness 18 includes a strip or endless belt 22 of reinforcing material which overlies the sheet material of the main body 12, a plurality of engagement means in the form of loop elements 24, and an additional reinforcement strip or endless belt 26. The reinforcing material 22 may comprise an additional or thicker layer of the same foldable sheet material as that used for the main body portion 12, or a rugged woven fabric exhibiting the desired chemical resistance fabric which is attached or bonded to the outer portion of the main body 12 adjacent the upper edge thereof by plastic bonding or welding techniques, the loop elements 24 are preferably a polyester or nylon web material and are stitched to the main body portion 12 using high tensile strength polyester thread 28. The loop elements 24 are attached to opposed sides of the bag 10 for reasons to be hereinafter described. The additional strip or endless belt 26 of polyester or nylon web material is stitched to the upper end of the main body portion 12 and overlies the loop elements 24 and the reinforcing material 22 to provide added support therefor.

Extending upwardly from the main body portion 12 is the extension portion 14 which is welded or otherwise bonded thereto. A rectangular sheet of foldable sheet material similar to that used in the main body portion 12 is used to fabricate the extension portion 14 and it is welded with a vertically extending seam 29 along one corner thereof. Provided at the upper or terminal end of the extension portion 14 is the lifting harness 20 of a construction similar to the lifting harness 18 on the main body portion 12, and it includes a reinforcing strip or belt 30 welded or otherwise secured to the upper end of the extension portion 14, a plurality of loop elements 32 stitched thereon in a spaced apart relationship on opposed sides of the portion 14, and a second reinforcing strip or belt 34 overlying the reinforcing strip 30 and the loop elements 32. These components 30-34 of the harness 20 are manufactured from materials similar to the materials used for the harness 18. Additionally, the harness 20 is provided with a length of flexible cord or rope 36 secured to the reinforcing belt 30 below the reinforcing belt 34 with an overlying patch 38 stitched thereto. The inner circumference of the upper portion of the harness 20 has extending thereabout a self-adhering closure 40, such as provided by an ever tacky or activatable adhesive or a hook and loop material of the type sold under the trademark VELCRO, which may be engaged upon itself to provide a closure for the extension portion 14.

Figure 2:
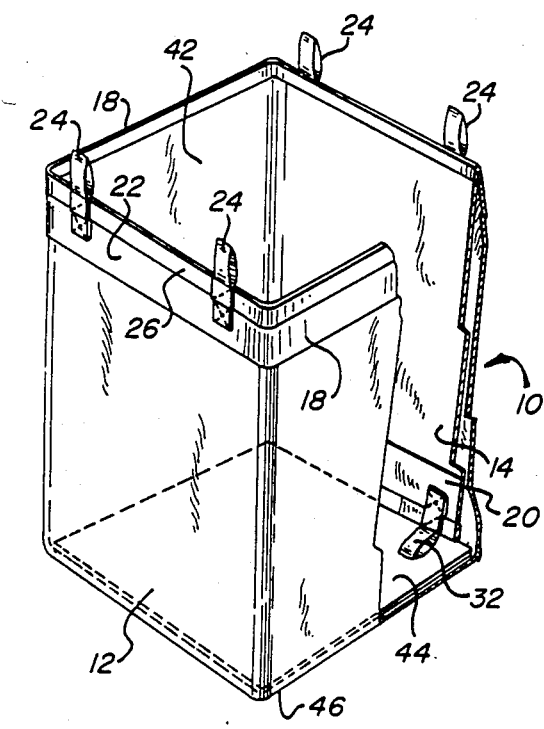
FIG. 2 is a perspective view of the spill containment bag shown in a partially extended condition with the reinforced bottom portion being inserted therein and with portions broken away to illustrate internal structure.

Turning now to FIG. 2, therein illustrated is the spill containment bag 10 in a partially extended condition with the extension portion 14 having been pushed or inserted into the interior of the main body portion 12 to lie flush against the sidewalls thereof and create an opening 42 therein. Also, a removable reinforcing member 44 preferably made from sheeting of similar to that utilized for the body portion 12, or a more rigid sheeting, or a woven fabric having the desired chemical resistance is shown inserted into the bag 10 to reinforce the bottom wall 46 of the main body portion 14. The reinforcing member 44 may be firmly secured to the inner or outer surface of the bottom wall 46 by utilizing welding or other bonding techniques.

Figure 3:
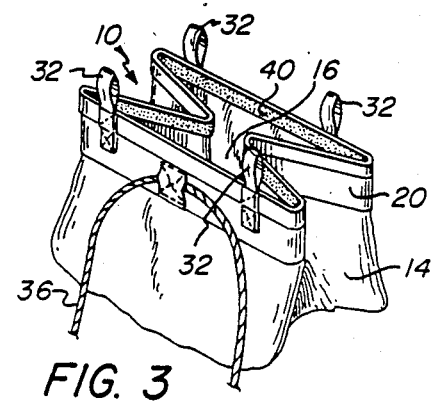
FIG. 3 is a fragmentary perspective view of the spill containment bag showing the upper portion of the extension portion in a partially closed condition.

As best seen in FIG. 3, the opening 16 of the extension portion 14 of bag 10 may be closed by folding the upper edge inwardly until the material of the self-adhering closure 40 comes into facing contact.

Figure 4:
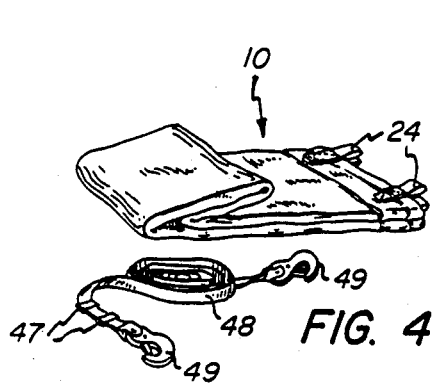
FIG. 4 is a perspective view of the spill containment bag shown in a collapsed or folded condition and an attachment strap used in conjunction therewith.

Turning now to FIG. 4, the bag 10 is depicted in a completely collapsed condition to permit easy storage in a truck or the like. Adjacent the bag 10 is an adjustable suspension or attachment strap 48 used to support the bag 10 in position to contain a spill of liquid material as will be hereinafter described. A pair of suspension straps 48 are provided with each bag and each would be adjustable by utilizing conventional length adjusting elements 47 to extend to a desired length, desirably a maximum of about twenty-two feet in length. Preferably, the straps 48 are made from a high strength nylon web material and have stainless steel safety hooks 49 disposed at the ends thereof.

Figure 7:
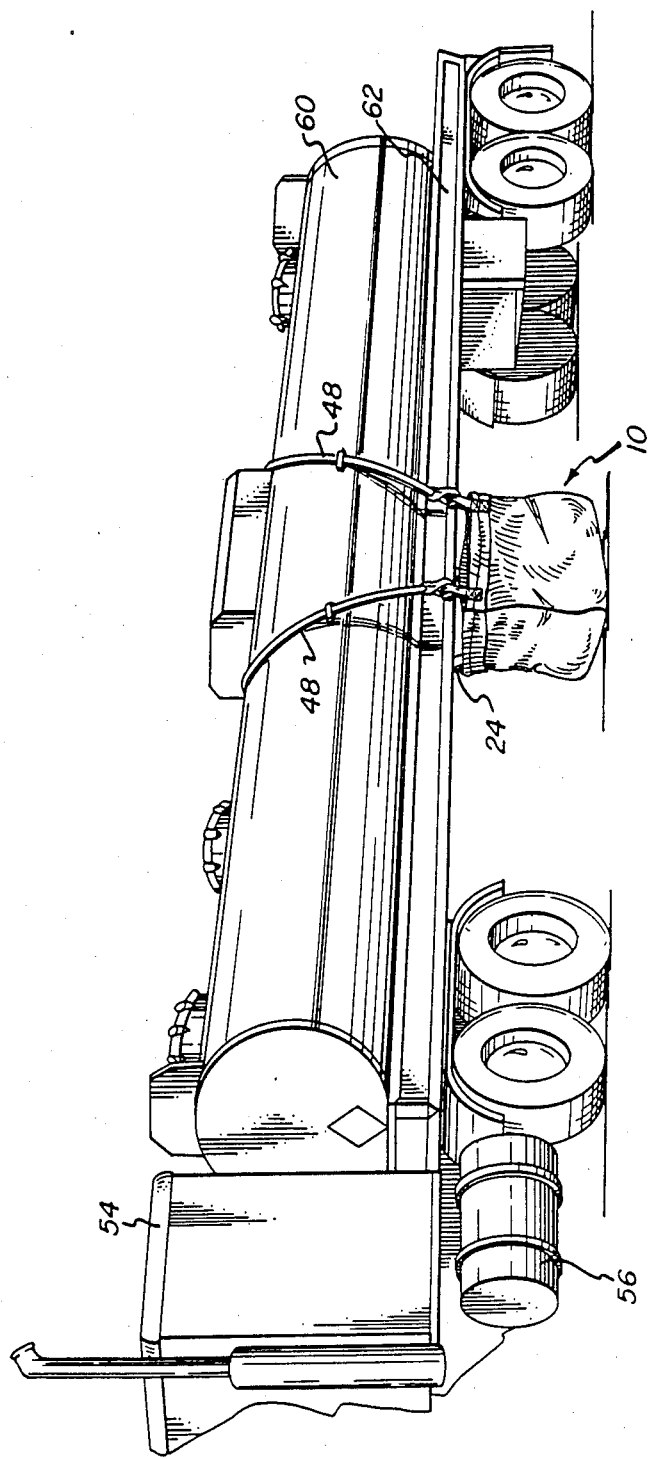

Illustrated in FIGS. 5-15 are methods of using the containment bag to contain spills of a liquid material. Referring first to FIGS. 5-7, a tanker truck, generally indicated by the numeral 50, has a tractor 52 with a cab 54 used in combination with a tanker trailer portion 56 for highway hauling of liquid materials.

As seen in FIG. 5, the tractor 52 normally has a diesel or gasoline powered engine and at least one fuel tank 58. In this instance, the fuel tank is below the cab 54 and a leak has developed allowing fuel to escape. The operator has brought the vehicle to a halt and has suspended one of the spill containment bags 10 from the tractor 52 by draping a pair of the straps 48 over the fuel tank 58 and inserting the safety hooks 49 through the loop elements 24 on harness 18 of the bag 10. It should be noted that the bag 10 is in a partially extended condition with the extension portion 14 in the interior thereof and the straps 48 adjusted by use of the length adjustment elements 47 to partially enclose the tank 58. Any fuel leaking from the tank 58 will be collected or contained within the bag 10 and will not fall onto the pavement or surrounding area.

The trailer 56 has a liquid containing tank 60 mounted on the chassis 62 for holding, transporting or storing liquids. Located at the midpoint of the chassis to one side thereof are a series of valves 64 which permit liquid to be drawn from, or supplied to, the tank 60. In this instance, one of the valves 64 has developed a leak therein and the operator, by utilizing the loops 24 and the straps 48, has suspended the spill containment bag 10 below the valves 64 from a structural element 66 on the trailer 56. Thus he has contained the liquid spill in a manner similar to that described with respect to the fuel tank 58.

Referring to FIG. 6, the trailer 56 of the tanker truck 50 also has a valve 66 located at the rear portion 68 thereof. The bag 10 has been expanded to its fully extended condition which will permit the collection of a substantially larger volume of liquid material, and it has been suspended over the valve 66 by the loops 24 and straps 48 to collect the liquid from the leak in the valve 66.

Another technique for suspending the bag 10 from the trailer 56 is illustrated in FIG. 7. The straps 48 are extended around the tank 60 and the chassis 62 and thereby support the bag 10 under the belly of the trailer 54 to collect the liquid from the leak.

It is contemplated that multiple bags (not shown) can be placed alongside the first bag 10 suspended from the tanker truck, and the contents may be transferred from the initial containment bag by a pump or siphon (not shown) to the adjacent bags. This would permit a larger volume of liquid material to be collected without changing bags and afford the operator or an emergency response team more time to alleviate the leakage problem.

After the leak is stopped, the liquid collected in the containment bag 10 can be pumped into an emergency tanker truck or back into the tanker 50. Thereinafter, the bag 10 can be decontaminated for reuse.

Turning now to FIGS. 8-11, the bag 10 is constructed and designed for transporting and disposing of drums of material as an inexpensive and easily stored "overpack". The fifty-gallon drum or barrel 70 containing liquid material has a leak which is causing a spill 72. The user 74 simply draws the bag 10 over the upright drum 70 and then inverts the drum 70 and bag 10. Thereafter, the self-adhering closure 40 and the cord 36 are utilized to close the top portion of the containment bag 10 to enclose the drum 70 and collect the liquid 76.

Alternatively, as seen in FIGS. 12-15, the barrel 70 is set in an upright position (FIG. 12) and tilted onto one edge to allow the bag 10 to be placed thereunder (FIG. 13), and the bag 10 is then placed completely under the barrel 70 and raising or pulled in the direction indicated by arrows 78 to enclose the barrel as seen in FIG. 14. The self adhering closure 40 and the cord 36 can be used as previously described to enclose the drum 70 (FIG. 15).

The bags of the present invention may be carried in a folded condition within a compartment of a vehicle so as to be readily accessible in an emergency situation to contain a spill of any liquid. The bags may be carried in the vehicles of state, local and federal authorities, or stored in strategic locations such as tool booths, state garages and weighing stations to enable rapid response to emergency spills and minimize the environmental impact. The bag may also be used to contain spills from railroad tank cars and the like.

It should be apparent to those skilled in the art that the containment bag 10 can be formed in a variety of sizes and in a variety of ways. The fabric material may be fabricated from polyamide, polybutylene, polyethylene, polyester, and polypropylene, and mixtures and laminates thereof providing the desired chemical inertness and capability of withstanding highly concentrated acids, alkalis, solvents, petrochemicals and other hazardous and non-hazardous liquid materials. The bags may be reinforced internally or externally with glass, resin, carbon or other fibers to increase strength, and they may be coated with surfacing materials to enhance their chemical resistance so long as they retain the necessary flexibility to enclose the leaking vessel. The bags may be color-coded or otherwise labelled to indicate the types of liquid material that may safely be contained therein. Additionally, each bag may be labelled with an expiration date indicating the date on which the bag must be replaced because aging and exposure to fumes of materials being transplanted may be deterious to the fabric. Finally, gloves and other personnel protective equipment may be provided with the bag as an emergency kit.

Thus, it can be seen from the foregoing specification and attached drawings that the spill containment bag and method of the present invention provide an effective means for providing a collapsible and reusable container for containing spills of liquid materials. The method enables rapid development of an easily stored container to control a hazardous leak, and the bag may be readily and relatively economically fabricated.

Having thus described the invention, what is claimed is:

1. In a method for containing a liquid spill from a tanker truck, the steps comprising:
    (a) providing a leak-proof, flexible spill containment bag of fluid-impervious material having a main body portion and an extension portion forming an enclosure having an opening at the top end thereof and means to suspend said bag said extension portion being folded into said main body portion, each of said main body portion and extension portion having lifting means about the outer periphery thereof; and
    (b) unfolding said extension portion into a position extending beyond said main body portion;
    (c) suspending said spill containment bag from a portion of a tanker truck having a leaking liquid containment vessel with said opening in said bag being disposed below and adjacent the point of the leak whereby the liquid material flows through said opening and into said enclosure.

2. The method in accordance with claim 1 wherein said means to suspend the containment bag includes a plurality of loop means on said main body portion comprising said lifting means and strap means engaged with said loop means, and wherein said strap means are secured to said truck.

3. In a method for containing a liquid spill from a liquid containing drum, the steps comprising:
   (a) providing a leak-proof flexible spill containment bag of fluid-impervious material forming an enclosure and including a main body portion and an extension portion with an opening at the top thereof and clsoure means thereabout, said extension portion being folded into said main body portion, each of said main body portion and extension portion having lifting means about the outer periphery thereof; and
   (b) unfolding said extension portion into a position extending beyond said main body portion;
   (c) inserting a leaking drum through said opening and into said enclosure; and
   (d) closing said closure means above said drum, whereby the liquid material escaping from said drum is contained within said enclosure.

4. The method in accordance with claim 3 wherein said inserting steps includes:
   (i) setting said drum in an upright position;
   (ii) placing said bag over said drum; and
   (iii) inverting said drum and bag in tandem.

5. The method in accordance with claim 3 wherein said inserting step includes:
   (i) setting said drum in an upright position;
   (ii) placing said bag underneath said drum; and
   (iii) pulling said bag upwardly about said drum to enclose the same.

6. In a method for containing a liquid spill from a vessel having a leak through which liquid is escaping, the steps comprising:
   (a) providing a leak-proof, flexible spill containment bag of fluid-impervious material forming an enclosure and including a main body portion and an extension portion with an opening at the top thereof and closure means therabout, said extension portion being folded into said main body portion, each of said main body portion and extension portion having lifting means about the outer periphery thereof; and
   (b) unfolding said extension portion into a position extending beyond said main body portion; and
   (c) coupling said spill containment bag to the leaking vessel with said opening in said bag disposed about the point of the leak whereby the liquid flows through said opening and into said enclosure.

7. The method in accordance with claim 6 wherein said leaking vessel is a tanker truck and said bag is suspended from a portion of said tanker truck.

8. The method in accordance with claim 6 wherein said leaking vessel is a drum and wherein said step of coupling said containment bag to said leaking container comprises the insertion of said leaking drum through the opening in said bag and into the enclosure, and wherein there is included the additional step closing said closure means above said drum whereby the liquid material escaping from said drum is contained within said enclosure.

* * * * *